United States Patent
Jin et al.

(10) Patent No.: US 7,738,201 B2
(45) Date of Patent: Jun. 15, 2010

(54) READ ERROR RECOVERY USING SOFT INFORMATION

(75) Inventors: Ming Jin, Lake Forest, CA (US); Hiau Choon Kee, Singapore (SG); Myint Ngwe, Singapore (SG); Liu Li, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 384 days.

(21) Appl. No.: 11/507,063

(22) Filed: Aug. 18, 2006

(65) Prior Publication Data

US 2008/0043356 A1  Feb. 21, 2008

(51) Int. Cl.
*G11B 5/09* (2006.01)
*G11B 20/10* (2006.01)
(52) U.S. Cl. ......................................... 360/39
(58) Field of Classification Search ........................ None
See application file for complete search history.

(56) References Cited

U.S. PATENT DOCUMENTS

| | | | | |
|---|---|---|---|---|
| 5,576,904 | A * | 11/1996 | Behrens | 360/51 |
| 7,136,244 | B1 * | 11/2006 | Rothberg | 360/53 |
| 2002/0071504 | A1 * | 6/2002 | Chen et al. | 375/341 |
| 2005/0052770 | A1 | 3/2005 | Osafune | |
| 2007/0047121 | A1 * | 3/2007 | Eleftheriou et al. | 360/51 |

OTHER PUBLICATIONS

Kurtas et al., "Detection Methods for Data-dependent Noise in Storage Channels," http://people.deas.harvard.edu/~kavcic/papers/CRC33.pdf, 22 pgs., printed Aug. 18, 2006.

* cited by examiner

*Primary Examiner*—Daniell L Negrón
(74) *Attorney, Agent, or Firm*—Shumaker & Sieffert, P.A.

(57) ABSTRACT

In general, this disclosure describes read recovery techniques for data storage devices that use soft information associated with multiple read operations to detect data. Specifically, the read recovery techniques comprise computing soft information for each bit detected during a first read operation of a data storage medium, computing soft information for each bit detected during a second read operation of the data storage medium and averaging the soft information computed during the first and second read operations to determine the value of each of the bits.

30 Claims, 4 Drawing Sheets

READ ERROR RECOVERY USING SOFT INFORMATION

TECHNICAL FIELD

The invention relates to data storage devices and, more particularly, to read error recovery in data storage devices.

BACKGROUND

Data storage devices, such as disc drives, store information on a storage medium. For example, in the case of disc drives data is stored on a magnetic disc medium. The magnetic disc medium includes a number of concentric circles, i.e., tracks, onto which data is stored. Each of the tracks is divided into a number of sectors, each sector including a predefined portion of the track. The disc drive reads and writes information to the sectors of the disc medium. Disc drives may encounter a read error during an attempt to read data from a sector of the disc medium. Read errors may occur, for example, due to poor magnetic head placement during read operations, adjacent track noise during read operations, poorly written data in the sector of interest, foreign matter on the disc surface or the like. Upon detecting a read error, the disc drive typically implements some sort of read retry scheme to successfully read the data from the disc medium.

SUMMARY

In general, this disclosure describes read error recovery techniques in data storage devices. The read error recovery techniques utilize soft information associated with multiple read operations. For example, a data storage medium, such as a disc drive may attempt to read a sector of a storage medium during a first read operation. In response to detecting an uncorrectable read error, the disc drive implements a read retry scheme (i.e., second read operation) to successfully read the information from the sector of the disc medium. The disc drive computes soft information for each bit detected during the first and second read operations. In one embodiment, the soft information is computed after synchronization and timing recovery have been performed. The disc drive averages the soft information for each bit computed during the first and second read operations to determine the value of each of the bits. In this manner, the disc drive implements a read retry scheme that improves detection performance of the disc drive with little or no impact on the data transfer rate. Moreover, by averaging soft information that is computed after synchronization and timing recovery, the disc drive reduces the SNR loss due to time and frequency offset differences between the two read operations.

In one embodiment, a method comprises averaging soft information associated with a first and second read operation of a data storage medium of a data storage device to determine a value of each bit of data read during the read operations.

In another embodiment, a disc drive comprises a disc medium that stores data and a magnetic head that reads data from the disc medium. The disc drive also includes a read channel that receives the data read by the magnetic head, computes soft information for each bit of the data detected during a first read operation, computes soft information for each bit of the data detected during a second read operation, and averages the soft information corresponding to each bit to determine the value of each of the bits.

In a further embodiment, a data storage device comprises a data storage medium and a read channel that receives data read from the storage medium, computes soft information for each bit of data read during a first and second read operation of a first sector of a data storage medium, and averages, for each bit, the soft information computed during the first and second read operations to determine the value of each of the bits.

In another embodiment, a method comprises performing a first read operation of a data storage medium of a data storage device, performing synchronization and timing recovery on information obtained during the first read operation and computing soft information for each bit detected during the first read operation after the synchronization and timing recovery. The method also comprises performing a second read operation of the data storage medium, performing synchronization and timing recovery on information obtained during the second read operation, and computing soft information for each bit detected during the second read operation after the synchronization and timing recovery. Additionally the method comprises averaging, for each bit, the soft information computed during the first and second read operations to determine the value of each of the bits.

The details of one or more embodiments of the invention are set forth in the accompanying drawings and the description below. Other features, objects, and advantages of the invention will be apparent from the description and drawings, and from the claims.

DETAILED DESCRIPTION

In general, this disclosure describes read error recovery techniques in data storage devices. The read error recovery techniques utilize soft information associated with multiple read operations of a storage medium. The techniques of this disclosure are described in the context of disc drives for exemplary purposes. The techniques, however, are applicable to any data storage device.

Figure 1:
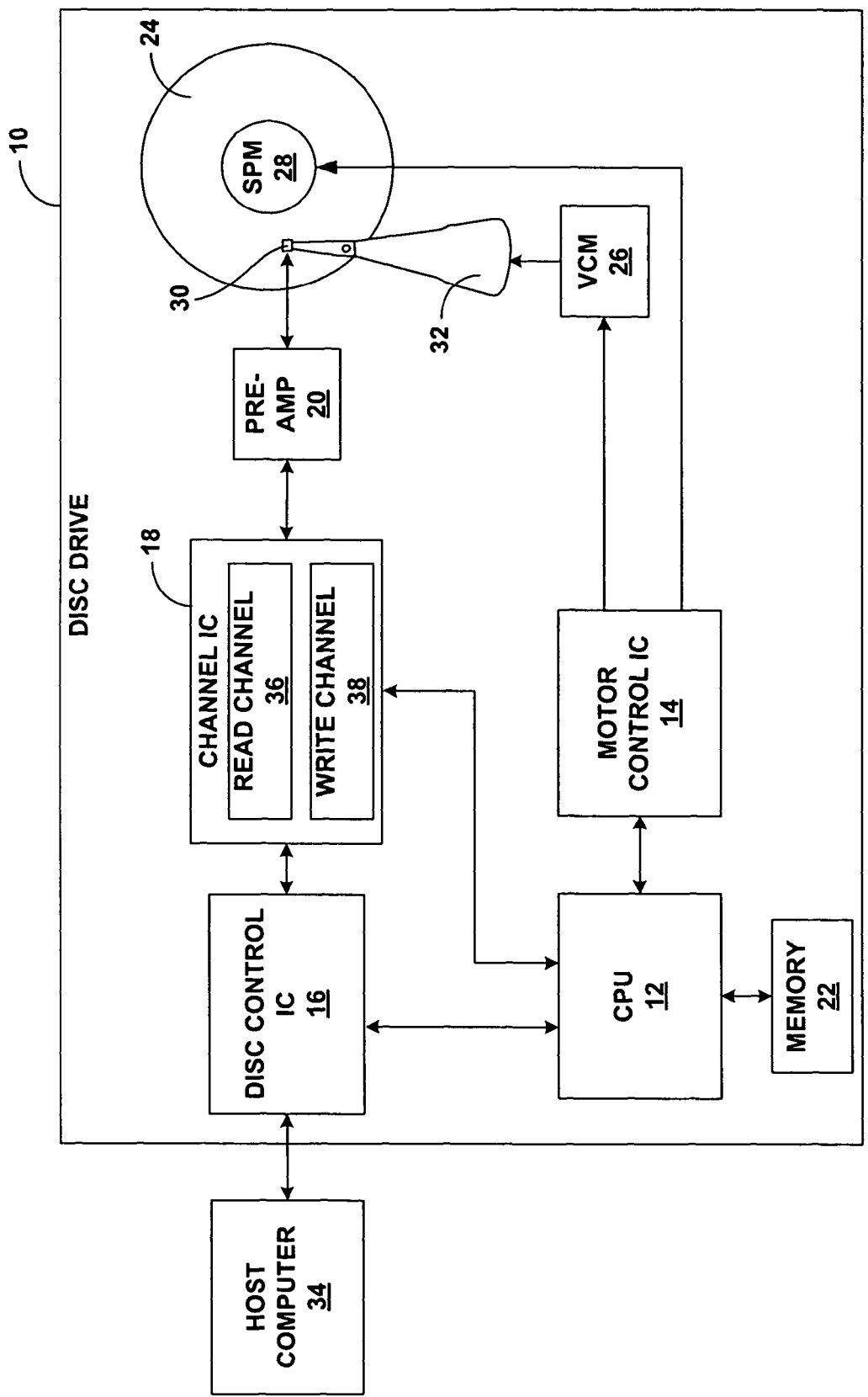
FIG. 1 is a schematic diagram illustrating an exemplary disc drive that performs read error recovery by averaging soft information associated with multiple read operations.

FIG. 1 is a schematic diagram illustrating an exemplary disc drive 10 that performs read error recovery by averaging soft information associated with multiple read operations. Disc drive 10 includes a microprocessor 12, a motor control integrated circuit (IC) 14, a disc control IC 16, a channel IC 18, a pre-amplifier (labeled "PRE-AMP") 20, and a memory 22. Disc drive 10 also includes a magnetic disc medium 24, a voice coil motor (VCM) 26, a spindle motor (SPM) 28, a magnetic head 30 and an actuator 32.

Magnetic disc medium 24 is mounted on SPM 28. SPM 28 rotates magnetic disc medium 24 at a high speed for reading and writing data onto magnetic disc medium 24. Magnetic head 30 performs the read and write operations on magnetic disc medium 24 using a read head and a write head, respectively. Magnetic head 30 is mounted on actuator 32. VCM 26 controls the radial movement of actuator 32 across magnetic disc medium 24 to place magnetic head 30 at a target track on disc medium 24.

Microprocessor 12 controls the operation of disc drive 10 using the various ICs. Microprocessor 12 may control disc drive 10 in accordance with a control program stored in memory 22. Memory 22 may comprise, for example, read-only memory (ROM), random access memory (RAM), electrically erasable programmable read-only memory (EEPROM) or the like.

Microprocessor 12 controls VCM 26 and SPM 28 via motor control IC 14. Microprocessor 12 may, for example, calculate one or more control variables for determining driving currents of VCM 26 and SPM 28, and send the control variables to motor control IC 14. In this manner, microprocessor 12 controls the speed of rotation of disc medium 24 and positioning of magnetic head 30 via motor control IC 14.

Motor control IC 14 controls operation of VCM 26 and SPM 28 in accordance with the control variables received from CPU 12. Particularly, motor control IC 14 controls the driving current of VCM 26 and SPM 28. For example, motor control IC 14 may include a VCM driver and an SPM driver (not shown) that provide driving current to VCM 26 and SPM 28, respectively. In this manner, motor control IC 14 controls SPM 28 to spin magnetic disc medium 24 and controls VCM 26 to move actuator 32 to place magnetic head 30 at a target track for a read or write operation.

Microprocessor 12 also controls the read/write functionality of disc drive 10 using disc control IC 16 and channel IC 18. Disc control IC 16 controls interactions between disc drive 10 and host computing device 34. Disc control IC 16 receives commands, such as read and write commands, from host computing device 34 and controls data transfer between host computing device 34 and disc drive 10. In this manner, disc control IC 16 functions as an interface between disc drive 10 and host computing device 34.

Disc control IC 16 also detects errors that occur during read operations. Disc control IC 16 may, for example, include an error detection unit (not shown) that detects the read errors. Read errors may occur due to poor magnetic head placement during read operations, adjacent track noise during read operations, poorly written data in the sector of interest, foreign matter on the disc surface or the like. Some read errors may be easily correctable, in which case disc control IC 16 corrects the read errors using one or more error correction algorithms. If the read errors detected by disc control IC 16 are uncorrectable, however, disc control IC 16 generates an error code that initiates the read retry scheme described in detail below.

Channel IC 18 executes various signal processing functions, including analog to digital conversion, digital to analog conversion, encoding, decoding and data detection. Channel IC 18 may include a read channel 36 and a write channel 38. Write channel 38 receives data to be recorded from disc control IC 16, encodes the data for writing onto magnetic disc medium 24, converts the data from digital to analog form and supplies the encoded data to pre-amplifier 20. Pre-amplifier 20 amplifies the encoded data and supplies the encoded data to magnetic head 30 for writing onto magnetic disc medium 24.

Channel IC 18 also performs various signal processing functions on data read from disc medium 24. Particularly, pre-amplifier 20 receives data read by magnetic head 30 from a particular sector of disc medium 24, amplifies the data read by magnetic head 30 and provides the data to read channel 36 of channel IC 18. Read channel 36 performs various signal processing functions on the data, such as analog to digital conversion, filtering, equalization, data detection, decoding and the like.

In the event that disc control IC 16 detects an uncorrectable read error, microprocessor 12 implements a read retry scheme to successfully read the information from the sector of disc medium 24. Particularly, microprocessor 12 initiates a read retry operation (i.e., a second read operation) on the same sector of disc medium 24. The read retry operation may, for example, comprise a bare re-read of the same sector or other read retry operation. Microprocessor may initiate a read retry without any significant changes to the read settings. For example, microprocessor 12 may supply the same control variables to motor control IC 14 to ensure that the disc spin speed and positioning of magnetic head 30 are the same. Alternatively, microprocessor 12 may initiate a read retry with different read settings than the first read retry.

Read channel 36 computes soft information for each bit detected during the first and second read operations. In one embodiment, read channel 36 computes the soft information after synchronization and timing recovery have been performed. Read channel 36 averages the soft information for each bit computed during the first and second read operations to determine the value of each of the bits. In this manner, disc drive 10 implements a read retry scheme that improves detection performance of disc drive 10 with little or no impact on the data transfer rate. Although the read retry scheme described in FIG. 1 uses soft information associated with only two read operations to determine the value of each of the bits, the read retry scheme may utilize soft information associated with more than two read operations.

Microprocessor 12, motor control IC 14, disc control IC 16 and channel IC 18 are illustrated in FIG. 1 as separate integrated circuits mounted on a printed circuit board assembly. Alternatively, however, two or more of microprocessor 12, motor control IC 14, disc control IC 16 and channel IC 18 may be integrated within a single integrated circuit. In other words, each of the ICs may be considered logic blocks within a single integrated circuit. Moreover, microprocessor 12, motor control IC 14, disc control IC 16 and channel IC 18 may be application specific integrated circuits (ASICs).

Figure 2:
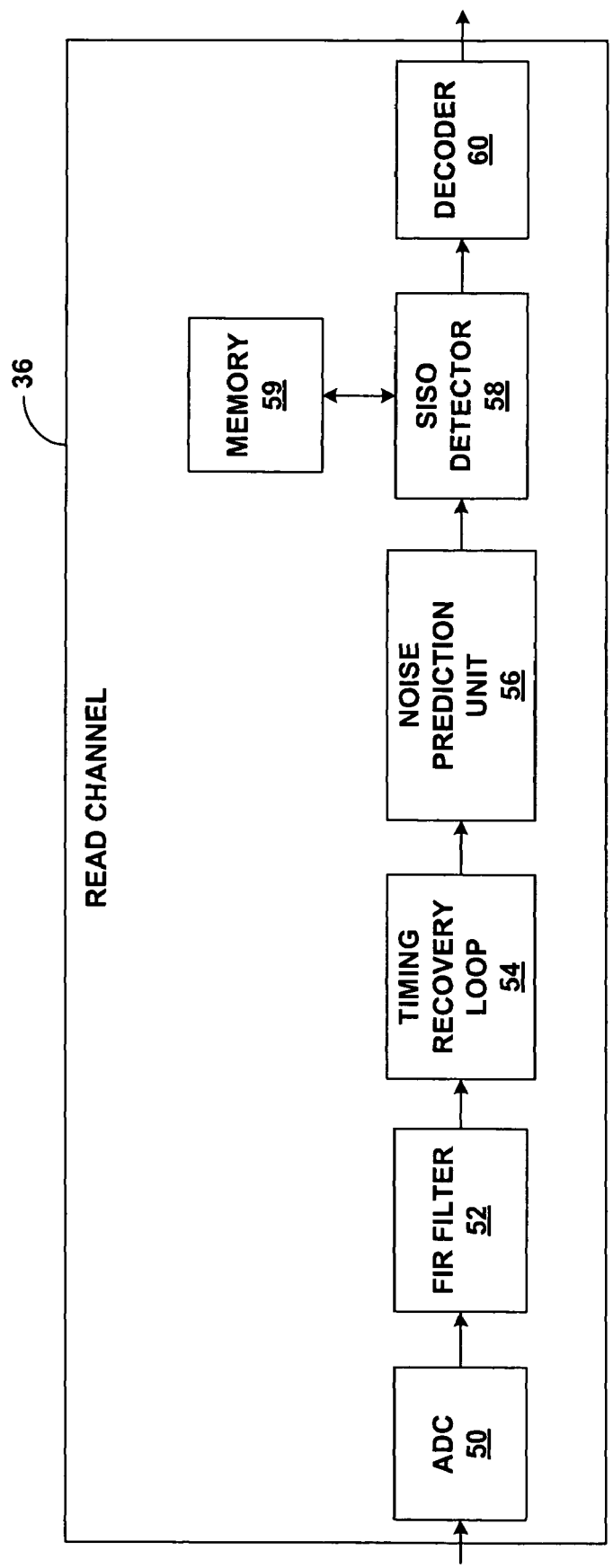
FIG. 2 is a block diagram illustrating an exemplary read channel that averages soft information associated with multiple read operations to detect data.

FIG. 2 is a block diagram illustrating an exemplary read channel, such as read channel 36 of FIG. 1, in further detail. Read channel 36 includes an analog-to-digital converter (ADC) 50, a finite impulse response (FIR) filter 52, a timing recovery loop 54, a noise prediction unit 56, a soft-input-soft-output (SISO) detector 58, a memory 59, and a decoder 60.

Read channel 36 receives a data signal from pre-amplifier 20 (FIG. 1). The data signal received from pre-amplifier 20 is a signal generated by magnetic head 30 during a read operation of a sector on disc medium 24. ADC 50 converts the analog data signal read from disc medium 24 to a digital signal.

FIR filter 52 filters the data signal output by ADC 50 to match signal characteristics of the data signal to the ideal target response for bit detection. FIR filter 52 may, for example, force a minimum mean squared error to match the target response of the channel, thus equalizing the data signal.

Timing recovery loop 54 detects the digital phase and frequency error of the equalized data signal. Timing recovery loop 54 computes the respective phase and frequency errors and compensates for those errors.

Noise prediction unit 56 functions as a noise whitener that equalizes the spectrum of the data signal, making it similar to the white noise spectrum. Noise prediction unit 56 thus enhances low level spectral components and attenuates high level ones.

SISO detector 58 computes soft information for each bit detected during the read operations. SISO detector 58 may, for example, compute log-likelihood ratios (LLRs) for each bit detected during the read operations. Alternatively, other soft information may be computed for each of the bits. The soft information associated with each bit indicates whether the bit is more likely a '1' or a '0'. SISO detector 58 may comprise a soft-decision output Viterbi algorithm (SOVA) detector, a Maximum A Posteriori (MAP) detector, or the like.

SISO detector 58 stores the computed soft information in a memory 59. Memory 59 may also store raw sampled waveforms, intermediate waveforms, such as, equalized waveforms filtered by FIR filter 52, synchronized waveforms output by timing recovery loop 54 or the like, as well as final decoded waveforms. Memory 59 may further be capable of storing information associated with more than one read operation. For example, memory 59 may store soft information and a number of waveforms associated with multiple read operations of the same sector or multiple read operations of different sectors of disc medium 24. Memory 59 may comprise a RAM, ROM, EEPROM or other type of memory.

As described above, microprocessor 12 implements a read retry scheme to successfully read the information from the sector of disc medium in the event that disc control IC 16 detects an uncorrectable read error. Read channel 36 receives data read by magnetic head 30 during the read retry operation (i.e., a second read operation). SISO detector 58 computes and stores soft information for each bit detected during second read operation. The LLR values may be computed using the equation:

$$LLR=\text{Log }[P(\text{bit}=+1|\text{received bit }y)/P(\text{bit}=-1|\text{received bit }y)],$$

where P(bit=+1|received bit y) is the probability that the bit is a +1 conditioned on the received bit y, and P(bit=-1|received bit y) is the probability that the bit is a -1 conditioned on the received bit y.

SISO detector 58 retrieves the soft information associated with both the first and second read operations, and averages the soft information for each bit. For example, assume SISO detector 58 computed a first LLR value of 0.4 for a bit during a first read and a second LLR value of -0.8 for the bit during the second read. SISO detector 58 may average the LLR values to by summing the first and second LLR value and dividing by two, to obtain an average LLR of -0.2.

Based on the averaged soft information, read channel 36 determines whether the bit is most likely a '1' or a '0'. Solving for P(bit=+1|received bit y)/P(bit=-1|received bit y) results in the equation above results in the equation:

$$P(\text{bit}=+1|\text{received bit }y)/P(\text{bit}=-1|\text{received bit }y)=e^{(\text{average }LLR\text{ value})}.$$

In the example described above, P(bit=+1|received bit y)/P(bit=-1|received bit y)=e^(-0.2)=0.82. Thus, read channel 36 determines that the bit is more likely a -1 which has been transmitted based on observation of received bit y, because P(bit=+1|received bit y) is less than P (bit=-1|received bit y). Although described as detecting a single bit, read channel 36 may use an LLR array as input measurements to detect the bit sequence rather than detecting one single bit at one time.

Decoder 60 decodes the data based on the soft information output by SISO detector 58 and forwards the decoded data to disc control IC 16 (FIG. 1). In this manner, read channel 36 improves detection performance of disc drive 10 with little or no impact on the data transfer rate.

In the embodiment illustrated in FIG. 2, SISO detector 58 computes the soft information associated with the multiple read operations after correction of the frequency and phase errors by timing recovery loop 54. As a result, the averaging of soft information does not introduce timing errors or otherwise significantly degrade the detection performance. In fact, the signal-to-noise (SNR) loss due to time and frequency offset differences between the two read events is reduced by averaging soft information that is computed after synchronization and timing recovery have been performed. Moreover, SISO detector 58 computes the soft information after processing by noise prediction unit 56, thus reducing the likelihood of changing or destroying the noise correlations between the multiple read operations and degrading the noise prediction process. Alternatively, however, the soft information may be computed elsewhere during the signal processing, e.g., after application of FIR filter 52, after ADC 50 or after timing recovery loop 54.

Figure 3:
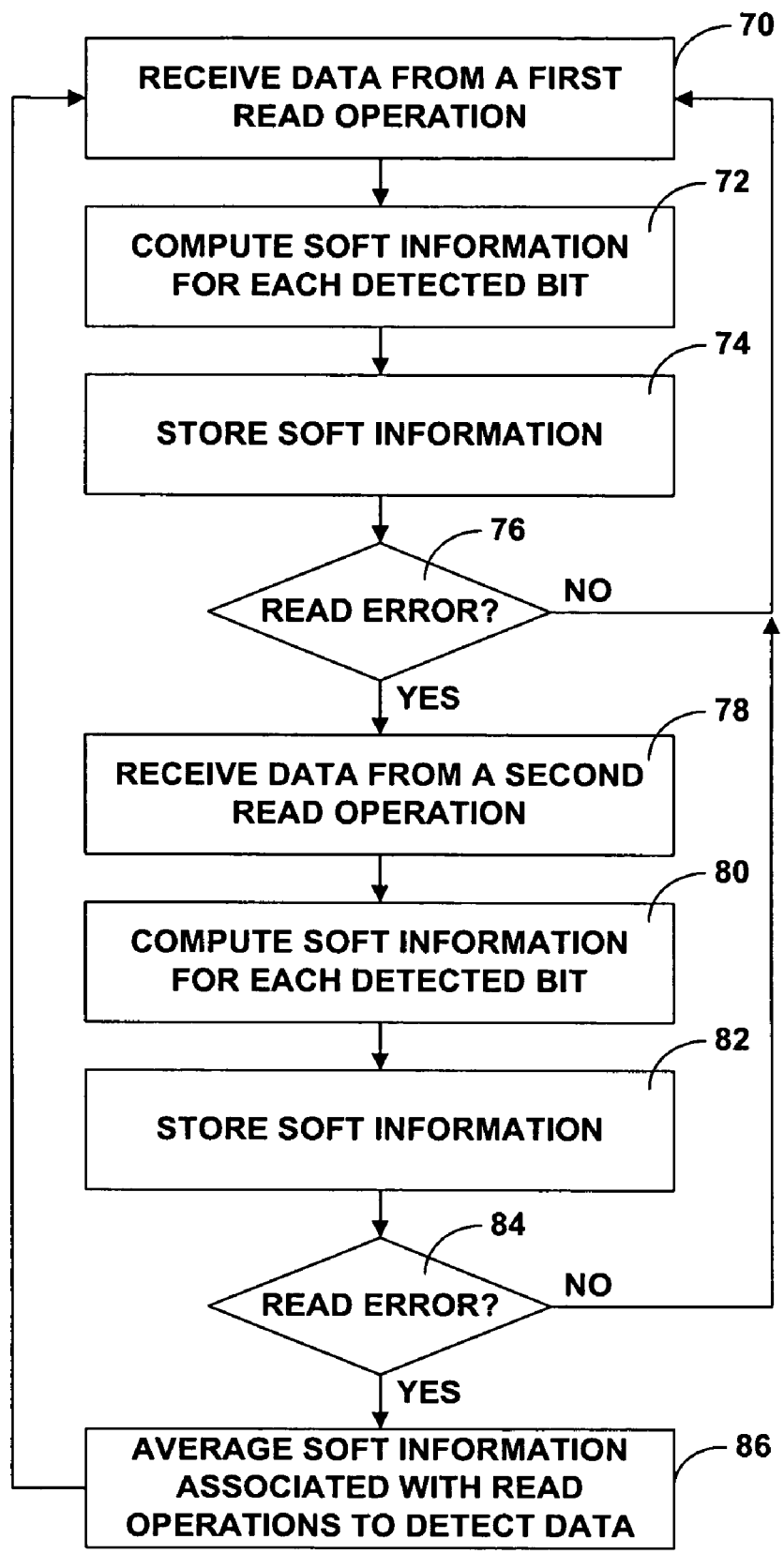
FIG. 3 is a flow diagram illustrating exemplary operation of a disc drive implementing a read recovery by averaging soft information associated with multiple read operations.

FIG. 3 is a flow diagram illustrating exemplary operation of read channel 36 detecting data by averaging soft information associated with multiple read operations. Initially, read channel 36 receives data from a first read operation (70). Microprocessor 12 may, for example, operate in conjunction with motor control IC 14 to read data from a first sector of disc medium 24 in response to a read command supplied by host computing device 34. Specifically, microprocessor 12 controls motor control IC 14 to drive VCM 26, in turn moving actuator 32 and magnetic head 30 to a specific location on disk medium 24.

Read channel 36 computes soft information associated with the data obtained during the first read operation (72). In particular, read channel 36 computes soft information for each detected bit of the data. In one embodiment, a SISO detector 58 computes LLRs for each detected bit using the equation:

$$LLR=\text{Log }[P(\text{bit}=+1|\text{received bit }y)/P(\text{bit}=-1|\text{received bit }y)].$$

SISO detector 58 may compute the soft information after synchronization and timing recovery have been performed on the data. As described above, SISO detector 58 may comprise, for example, a SOVA detector, an MAP detector or the like. Read channel 36 stores the computed soft information in memory 59 (74).

Disc control IC 16 determines whether a read error exists (76). Disc control IC 16 may, for example, detect an uncorrectable read error due to poor magnetic head placement during the read operation, adjacent track noise during the read operation, poorly written data in the sector of interest, foreign matter on the disc surface or the like.

If disc control IC 16 does not detect a read error or detects a read error that is correctable, microprocessor 12 initiates the next read or write operation in its sequence. For example, microprocessor 12 may read information from a subsequent sector of disc 24. If disc control IC detects an uncorrectable read error, however, read channel 36 receives data from a second read operation (78). Microprocessor 12 initiates the read retry operation (i.e., the second read operation) on the same sector of disc medium 24 in response to identifying a read error from disc control IC 16. Microprocessor 12 may perform the read retry without any significant changes to the read settings. For example, microprocessor 12 may supply the same control variables to motor control IC 14 to ensure that the disc spin speed and positioning of magnetic head 30 are the same. Alternatively, one or more of the read settings may be adjusted.

Read channel 36 computes soft information associated with the data obtained during the second read operation (80). As with the soft information computed for data obtained during the first read operation, read channel 36 computes soft information for each detected bit of the data. The soft information may, for example, comprise LLRs for each of detected bit of data computed by SISO detector 58. Again, SISO detector 58 may compute the LLRs after synchronization and timing recovery have been performed. Read channel 36 stores the computed soft information associated with the second read operation in memory 59 (82).

Disc control IC 16 determines whether a read error exists (84). If disc control IC does not detect a read error or detects a read error that is correctable, microprocessor 12 initiates the next read or write operation in its sequence. For example, microprocessor 12 may read information from a subsequent sector of disc 24. Alternatively, disc control IC 16 may not determine whether a read error occurred during the second read operation, but instead immediately proceed to average the soft information associated with the two read operations.

If disc control IC 16 detects an uncorrectable read error during the second read operation or if no read error detection is performed on the second read retry, read channel 36 averages the soft information associated with the data obtained by the first and second read operations to detect the data (86). Specifically, read channel 36 retrieves the soft information associated with both the read operations from memory 59, and computes the average for each of the bits. In the case in which the soft information is LLRs, for example, read channel 36 averages the LLRs for each of the bits to detect the data. Read channel 36 may use an LLR array as input measurements to detect the bit sequence rather than detecting each bit individually. In this manner, the read retry scheme improves detection performance of read channel 36 with little or no impact on the data transfer rate. Moreover, by averaging soft information that is computed after synchronization and timing recovery, SNR loss due to time and frequency offset differences between the two read events is reduced.

Although the read retry scheme described in FIG. 3 averages soft information associated with two read operations to determine the value of each of the bits, the read retry scheme may compute soft information for more than two read operations and average the soft information computed for those read operations to determine the value of each of the bits.

Figure 4:
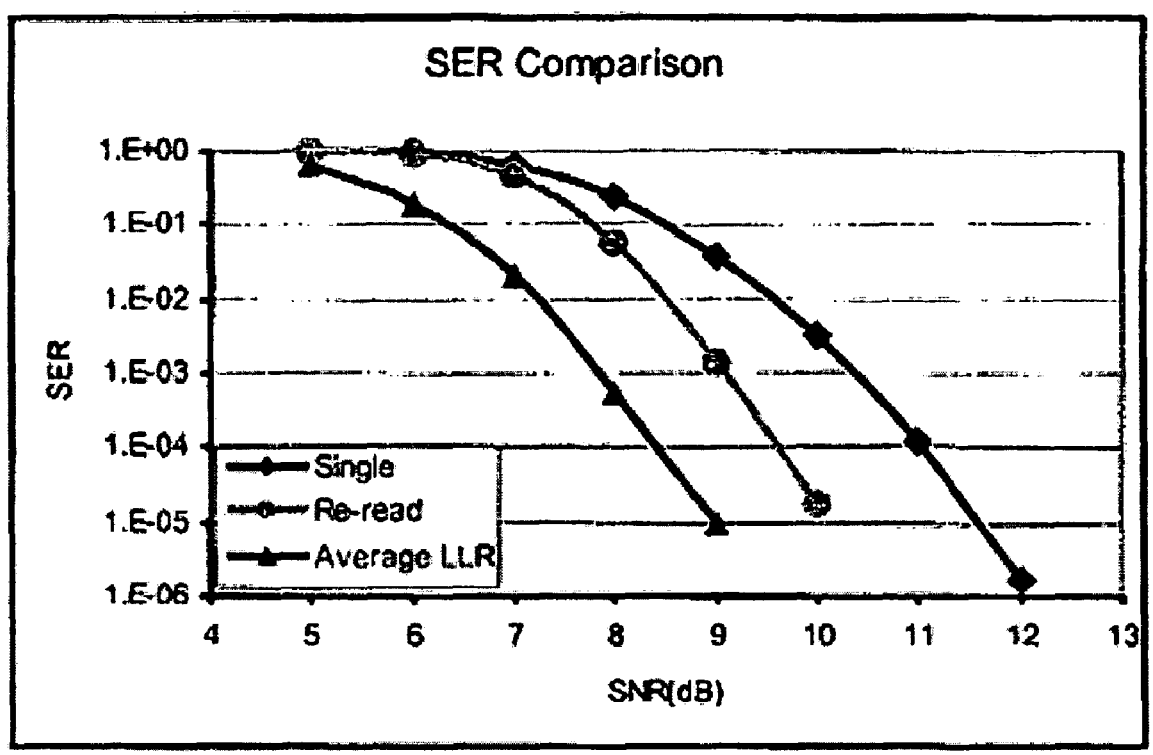
FIG. 4 is a graph illustrating exemplary sector error rates (SERs) for a number of read retry schemes.

FIG. 4 is a graph illustrating exemplary sector error rates (SERs) for a number of read retry schemes. The horizontal axis of the graph represents the signal-to-noise ratio (SNR) in decibels (dB) and the vertical axis represents the SERs. The graph of FIG. 4 illustrates the results of three different read retry schemes; a normal single read (i.e., without any read retry), a bare re-read scheme, and the averaging LLR retry scheme described in this disclosure.

As illustrated in the graph of FIG. 4, the averaging LLR retry scheme results in a significant improvement in the SNR compared with the normal single read and the bare re-read schemes. Particularly, the LLR retry scheme results in approximately a 3 dB reduction in the SNR compared to the normal single read, and approximately a 1 dB reduction in the SNR compared with the bare re-read scheme. Moreover, as described above, this improvement in SNR comes without additional data transfer loss. The results illustrated in FIG. 4 were obtained using a Monte Carlo simulation performed on a PR4 channel corrupted by additive white Gaussian noise (AWGN).

Although the techniques described in this disclosure are described with respect to disc drives, the techniques are equally applicable to other data storage devices that utilize other storage media. Various embodiments of the invention have been described. These and other embodiments are within the scope of the following claims.

The invention claimed is:

1. A method comprising:
   performing a first read operation of a data storage medium of a data storage device;
   after converting a first read signal generated during the first read operation to a first plurality of bits, computing one soft information value for each of the first plurality of bits detected during the first read operation to generate a first set of soft information values, wherein the first set of soft information values are distinct from the bits detected during the first read operation;
   performing a second read operation of the data storage medium;
   after converting a second read signal generated during the second read operation to a second plurality of bits, computing one soft information value for each of the second plurality of bits detected during the second read operation to generate a second set of soft information values, wherein the second set of soft information values are distinct from both the bits detected during the second read operation and from the first set of soft information values; and
   averaging each corresponding soft information value from the first set and the second set to determine a set of final corresponding bit values.

2. The method of claim 1, wherein computing soft information values for each of the bits detected during the first and second read operations comprises computing log-likelihood ratios (LLRs) for each of the bits detected during the first and second read operations.

3. The method of claim 1, further comprising:
   performing the first read operation on a first sector of the storage medium;
   detecting a read error associated with the first read operation; and
   performing the second read operation on the first sector of the storage medium in response to detecting the read error.

4. The method of claim 3, further comprising performing a first read operation on a second sector of the storage medium upon failure to detect a read error associated with the first read operation.

5. The method of claim 3, further comprising performing a first read operation on a second sector of the storage medium upon failure to detect a read error associated with the second read operation.

6. The method of claim 3, wherein performing the second read operation comprises performing the second read operation using the same read settings used for the first read operation.

7. The method of claim 1, wherein averaging, for each bit, the one corresponding soft information value from the first set computed during the first read operation and the one corresponding soft information value from the second set computed during the second read operation to determine the value of each of the bits comprises averaging the soft information after synchronization and timing recovery.

8. The method of claim 1, wherein averaging, for each bit, the one corresponding soft information value from the first set computed during the first read operation and the one corresponding soft information value from the second set computed during the second read operation to determine the value of each of the bits comprises averaging the soft information after noise prediction.

9. A disc drive comprising:
 a disc medium that stores data;
 a magnetic head that reads a data signal from the disc medium; and
 a read channel that is configured to:
  receive the data signal read by the magnetic head;
  after converting the data signal read by the magnetic head during a first read operation to a first plurality of bits, compute one soft information value for each of the first plurality of bits detected during the first read operation to generate a first set of soft information values, wherein the first set of soft information values are distinct from the bits detected during the first read operation;
  after converting the data signal read by the magnetic head during a second read operation to a second plurality of bits, compute one soft information value for each of the second plurality of bits detected during the second read operation to generate a second set of soft information values, wherein the second set of soft information values are distinct from both the bits detected during the second read operation and from the first set of soft information values; and
  average each corresponding soft information value from the first set and the second set to determine a set of final corresponding bit values.

10. The disc drive of claim 9, wherein the read channel performs synchronization and timing recovery on the data and computes soft information values for each bit of the data detected during the first and second read operation after performing the synchronization and timing recovery.

11. The disc drive of claim 9, wherein the read channel performs noise prediction on the data and computes soft information values for each bit detected during the first and second read operation after performing the noise prediction.

12. The disc drive of claim 9, wherein the read channel includes a soft-input-soft-output (SISO) detector that computes the soft information.

13. The disc drive of claim 12, wherein the SISO detector comprises a Maximum A Posteriori (MAP) detector.

14. The disc drive of claim 12, wherein the SISO detector comprises a Soft Output Viterbi algorithm (SOVA) detector.

15. The disc drive of claim 9, wherein the soft information values comprise log-likelihood ratios (LLRs) for each of the bits detected during the first and second read operations.

16. The disc drive of claim 9, further comprising:
 a microprocessor that initiates a first read operation on a first sector of a disc medium; and
 a disc control IC that detects a read error associated with the first read operation, wherein the microprocessor initiates a second read operation on the first sector of the disc medium in response to the detection of the read error.

17. The disc drive of claim 16, wherein the microprocessor initiates a first read operation on a second sector of the disc medium in response to disc control IC not detecting a read error associated with the first read operation.

18. The disc drive of claim 16, wherein the microprocessor initiates a first read operation on a second sector of the disc medium in response to disc control IC not detecting a read error associated with the second read operation.

19. The disc drive of claim 16, wherein the microprocessor initiates the second read operation using the same read settings used for the first read operation.

20. The disc drive of claim 9, wherein the read channel further includes a memory for storing the soft information values computed for each of the bits during the first and second read operations.

21. The disc drive of claim 9, further comprising a timing recovery loop that corrects frequency and phase errors of the data read by the magnetic head, wherein the soft-input-soft-output detector computes the soft information values for each of the bits detected during the first read operation after correction of the frequency and phase errors.

22. A data storage device comprising:
 a data storage medium; and
 a read channel that is configured to:
  receive a data signal read from the storage medium;
  after converting the data signal read from the storage medium during a first read operation to a first plurality of bits, compute one soft information value for each of the first plurality of bits read during the first read operation to generate a first set of soft information values, wherein the first set of soft information values are distinct from the bits detected during the first read operation of a first sector of a data storage medium;
  after converting the data signal read by the magnetic head during a second read operation to a second plurality of bits, computes one soft information value for each of the second plurality of bits read during the second read operation to generate a second set of soft information values, wherein the second set of soft information values are distinct from both the bits detected during the second read operation of the first sector of the data storage medium and from the first set of soft information values; and
  average each corresponding soft information value from the first set and the second set to determine a set of final corresponding bit values.

23. The data storage device of claim 22, wherein the read channel computes log-likelihood ratios (LLRs) for each of the bits detected during the first and second read operations.

24. The data storage device of claim 22, wherein the read cannel performs synchronization and timing recovery on the data read during the first and second read operations, and computes soft information values for each bit of the data detected during the first and second read operation after performing synchronization and timing recovery.

25. The data storage device of claim 22, further comprising a noise prediction unit that predicts noise associated with the data, wherein the read channel computes soft information values for each bit detected during the first and second read operation after the predicting the noise.

26. The data storage device of claim 22, further comprising an error detection unit to detect a read error associated with one of the first and second read operations.

27. The data storage device of claim 22, further comprising a memory to store the soft information values computed for each of the bits during the first and second read operations in a memory.

28. A method comprising:
 performing a first read operation of a data storage medium of a data storage device;
 performing synchronization and timing recovery on information obtained during the first read operation;
 after converting a first read signal generated during the first read operation to a first plurality of bits, computing one soft information value for each of the first plurality of bits detected during the first read operation after the synchronization and timing recovery to generate a first set of soft information values, wherein the first set of soft information values are distinct from the bits detected during the first read operation;

performing a second read operation of the data storage medium;

performing synchronization and timing recovery on information obtained during the second read operation;

after converting a second read signal generated during the second read operation to a second plurality of bits, computing one soft information value for each of the second plurality of bits detected during the second read operation after the synchronization and timing recovery to generate a second set of soft information values, wherein the second set of soft information values are distinct from the bits detected (luring the second read operation, and wherein the second set of soft information values are distinct from both the bits detected during the second read operation and from the first set of soft information values; and averaging each corresponding soft information value from the first set and the second set to determine a set of final corresponding bit values.

29. A method comprising:

performing a first read operation on a first sector of a data storage medium of a data storage device;

after convening a first read signal generated during the first read operation to a first plurality of bits, computing soft information for each of the first plurality of bits detected during the first read operation;

performing a second read operation on the first sector of the data storage medium in response to detecting a read error associated with the first read operation;

after convening a second read signal generated during the second read operation to a second plurality of bits, computing soft information for each of the second plurality of bits detected during the second read operation;

averaging, for each bit, the soft information computed during the first and second read operations to determine a set of final corresponding bit values; and performing a read operation on a second sector of the storage medium upon failure to detect the read error associated with either the first read operation or the second read operation.

30. A disc drive comprising:

a disc medium that stores data;

a magnetic head that a reads data signal from the disc medium;

a microprocessor that initiates a first read operation on a first sector of a disc medium;

a disc control IC configured to detect a read error associated with the first read operation, wherein the microprocessor initiates a second read operation on the first sector of the disc medium in response to the disc control IC detecting the read error associated with the first operation, and wherein the microprocessor initiates a first read operation on a second sector of the disc medium in response to disc control IC not detecting a read error associated with either the first read operation or the second read operation;

a read channel that receives the data signal read by the magnetic head, that computes, after convening the data signal read by the magnetic head during the first read operation to a first plurality of bits, soft information for each of the first plurality of bits detected during a first read operation, that computes, after converting the data signal read by the magnetic head during a second read operation to a second plurality of bits, soft information for each of the second plurality of bits detected during a second read operation, and that averages the soft information corresponding to each bit to determine a set of final corresponding bit values.

* * * * *